United States Patent
Finlayson (10) Patent No.: US 9,001,214 B2
(45) Date of Patent: Apr. 7, 2015

(54) SPECTRAL ESTIMATION METHOD, SYSTEM AND REFERENCE TARGET DESIGN METHOD

(71) Applicant: University of East Anglia, Norwich, Norfolk (GB)

(72) Inventor: Graham Finlayson, Norwalk (GB)

(73) Assignee: University of East Anglia, Norwich (GB)

( * ) Notice: Subject to any disclaimer, the term of this patent is extended or adjusted under 35 U.S.C. 154(b) by 0 days.

(21) Appl. No.: 14/357,533

(22) PCT Filed: Nov. 9, 2012

(86) PCT No.: PCT/GB2012/052791
§ 371 (c)(1),
(2) Date: May 9, 2014

(87) PCT Pub. No.: WO2013/068759
PCT Pub. Date: May 16, 2013

(65) Prior Publication Data
US 2014/0307104 A1   Oct. 16, 2014

(30) Foreign Application Priority Data
Nov. 10, 2011   (GB) .................................. 1119405.7

(51) Int. Cl.
H04N 17/00 (2006.01)
H04N 17/02 (2006.01)
H04N 1/60 (2006.01)

(52) U.S. Cl.
CPC ........... *H04N 17/002* (2013.01); *H04N 1/6083* (2013.01); *H04N 1/6086* (2013.01)

(58) Field of Classification Search
USPC .......... 348/187, 180, 189, 174, 175, 177, 68, 348/70, 131, 133, 135, 137, 142, 146, 348/218.1, 229.1, 230.1, 236, 237, 238, 348/249, 269, 294, 333.11, 340, 350, 351, 348/370, 813; 725/34, 35, 36
See application file for complete search history.

(56) References Cited

U.S. PATENT DOCUMENTS 5,793,884 A * 8/1998 Farrell .......................... 382/167
5,907,629 A * 5/1999 Funt et al. ..................... 382/162

(Continued)

FOREIGN PATENT DOCUMENTS

WO   WO 2006/103469   10/2006

OTHER PUBLICATIONS

Kobus Barnard et al: "A Comparison of 1-40 Computational Color Constancy Algorithms-Part I : Methodology and Experiments With Synthesized Data", IEEE Transactions on Image Processing, IEEE Service Center, Piscataway, NJ, US, vol. 11, No. 9, Sep. 1, 2002, XP011074299.

(Continued)

*Primary Examiner* — Jefferey Harold
*Assistant Examiner* — Mustafizur Rahman
(74) *Attorney, Agent, or Firm* — Leason Ellis LLP (57) ABSTRACT

A method, system and reference target for estimating spectral data on a selected one of three spectral information types is disclosed. Spectral information types comprise illumination of a scene, spectral sensitivity of an imager imaging the scene and reflectance of a surface in the scene. The method comprises obtaining a ranking order for plural sensor responses produced by the imager, each sensor responses being produced from a reference target in the scene, obtaining, from an alternate source, data on the other two spectral information types, determining a set of constraints, the set including, for each sequential pair combination of sensor responses when taken in said ranking order, a constraint determined in dependence on the ranking and on the other two spectral information types for the respective sensor responses and, in dependence on the ranking order and on the set of constraints, determining said spectral data that optimally satisfies said constraints.

20 Claims, 4 Drawing Sheets

(56) References Cited

U.S. PATENT DOCUMENTS

| | | | |
|---|---|---|---|
| 7,106,359 B2* | 9/2006 | Fantone et al. | 348/81 |
| 7,489,396 B1* | 2/2009 | Vrhel et al. | 356/319 |
| 7,616,810 B2* | 11/2009 | Dolan et al. | 382/162 |
| 8,723,961 B2* | 5/2014 | Jin et al. | 348/187 |
| 2001/0048468 A1* | 12/2001 | Fantone et al. | 348/81 |
| 2003/0194125 A1* | 10/2003 | Hubel et al. | 382/162 |
| 2004/0212688 A1* | 10/2004 | Takano et al. | 348/218.1 |
| 2005/0231626 A1* | 10/2005 | Tuttle et al. | 348/340 |
| 2006/0177137 A1* | 8/2006 | Friedhoff | 382/199 |

OTHER PUBLICATIONS

Finlayson Graham D et al: "Shades of Gray and Colour Constancy", Final Program and Proceedings of the IS&T/SID Color Imagingconference: Color Science, Systems, and Applications, No. 12, Nov. 9, 2004, pp. 37-41, XP008069434.

Finlayson G D et al: 11 Colour Constancy Using the Chromagenic Constraint, Computer Vision and Pattern Recognition, 2005 IEEE Computer Society Conference on, IEEE, Piscataway, NJ, USA, vol. 1, Jun. 20, 2005, pp. 1079-1086, XP010817463.

* cited by examiner

SPECTRAL ESTIMATION METHOD, SYSTEM AND REFERENCE TARGET DESIGN METHOD

CROSS REFERENCE TO RELATED APPLICATIONS

This application is a U.S. National Phase Application under 35 U.S.C. §371 of International Patent Application No. PCT/GB2012/052791, filed Nov. 9, 2012, and claims priority under 35 U.S.C. §119 to Great Britain Patent Application GB1119405.7, filed Nov. 10, 2011, which are hereby incorporated by reference in their respective entireties herein. The International Application was published as International Publication No. WO 2013/068759 under PCT Article 21(2).

FIELD OF THE INVENTION

The present invention relates to a system and method for use in spectral estimation and also to a reference target that is particularly suitable for use with the method and system.

BACKGROUND TO THE INVENTION

Spectral estimation methods attempt to account for the interaction of light, sensor and surface in forming a colour image, and to provide algorithms for inverting image formation: recovering spectral quantities from the camera RGB (or other colour space) values.

Solving this inverse problem is very hard, yet understanding the spectra that drive image formation is very important in many applications including photography, computer vision (and visual inspection), forensic imaging, medical applications and also understanding luminance response in low light levels.

The standard image formation equation is set out in equation (1) below:

$$\underline{\rho} = f\left(\int_\omega Q(\lambda)E(\lambda)S(\lambda)d\lambda + \underline{n}\right) \quad (1)$$

Here, $Q(\lambda)$ is the spectral sensitivity of the imaging device (for example an eye or camera), $E(\lambda)$ is the spectral power distribution of the illumination and $S(\lambda)$ is the % spectral reflectance function. Integration is across the visible spectrum $\omega$ (which is often modelled as 400 to 700 nm). Noise is represented by the 3-vector n and f( ) models non-linearities in the sensor and in image encoding. Common non-linearities include gamma (RGBs are raised to the power of 1/2.2 to compensate for the non linearity of display devices), camera curves and tone-curves. Given only $\rho$, that is, only the 3 RGB camera measurements, it is clearly tremendously difficult to estimate the continuous functions of wavelength ($Q(\lambda)$, $E(\lambda)$, or $S(\lambda)$).

Because of its complexity and dependence on so many factors, spectral estimation is not typically considered and, instead, expensive pre-calibrated equipment is specified and/or complex expensive measurement systems that operate best in controlled environments may be used.

Clearly, for the average camera user, this is neither practical nor cost effective. Similarly with the advent of smart-phones, while applications for their use are advancing significantly (with "apps" for medical practitioners amongst others being very popular), equipment such as the phones' camera is much of an afterthought.

STATEMENT OF THE INVENTION

According to an aspect of the present invention, there is provided A method for estimating spectral data on a selected one of three spectral information types comprising:
 illumination of a scene;
 spectral sensitivity of an imager imaging the scene; and,
 reflectance of a surface in the scene,
 the method comprising:
 obtaining a ranking order for a plurality of sensor responses produced by the imager, each of the plurality of sensor responses being produced from a reference target in the scene;
 obtaining, from an alternate source, data on the other two spectral information types; and,
 determining a set of constraints, the set including, for each sequential pair combination of sensor responses when taken in said ranking order, a constraint determined in dependence on the ranking and on the other two spectral information types for the respective sensor responses;
 in dependence on the ranking order and on the set of constraints, determining said spectral data that optimally satisfies said constraints.

The step of determining said spectral data may include:
 in dependence on the ranking order and on said constraints, determining a space bounded by the intersection of at least a subset of said constraints; and,
 determining said spectral data on the selected spectral information type that optimally satisfies said constraints whereby said estimated spectral data lies in a space bounded by the intersection of at least a subset of said constraints.

The method may further comprise applying a weighting factor to one or more of said constraints prior to determining said space.

The step of determining said space may include selecting a subset of said constraints in dependence on data on reliability of the respective constraints.

The method may further comprise performing the step of applying a weighting factor or selecting a subset upon the step of determining the space meeting a predetermined criterion.

The predetermined criterion may comprise determining there is substantially no space bounded by the intersection of the at least a subset of said constraints.

The method may further comprise guiding said determination of said spectral data using information about the likely spectral shape of the spectral data.

The method may further comprise requiring the spectral data to be a linear sum of a small number of basis functions or a member of a defined convex set that is a subset of all spectral quantities.

The method may further comprise generating a measure of uncertainty with respect to said estimated spectral data, said measure of uncertainty being dependent on the size of the space bounded by the intersection of the at least a subset of said constraints.

The measure of uncertainty may be weighted upon application of a weighting factor to one or more constraints or upon selection of a subset of said constraints in dependence on data on reliability.

Each constraint may comprise a half-space constraint. Each constraint may be a defined extension of a half-space constraint.

The step of determining said spectral data that optimally satisfies said constraints may include solving a projection on convex sets to determine the spectral data that optimally satisfies said constraints.

The step of solving a projection on convex sets may comprise solving:

$$\min_{\underline{v}} \sum_{i=1}^{N} d(H_i, \underline{v}) \text{ s.t. } \sum_j v_j = 1$$

Where:
$H_i$ is the set of constraints
$\underline{v}$ is the spectral data to be estimated; and,
$d(H_i, \underline{v})$ is the distance between the closest point in $H_i$ to $\underline{v}$ The imager may comprise an eye of a viewer of the scene, the method comprising obtaining the ranking order from the viewer.

The imager may comprise an imaging device, the method further comprising obtaining image data from the imaging device, the image data representing the scene.

The step of obtaining a ranking may include ranking the image data obtained from the imaging device in respect of the plurality of spectral responses.

Determining the spectral data that optimally satisfies said constraints may be evaluated in dependence on criterion selected from the set including:

minimising a least-squares error criterion; minimizing a robust least-squares criterion; convex minimisation; quadratic programming.

The selected spectral information type may comprise spectral sensitivity of the imager imaging the scene, wherein the reference target comprises a reflective target with known spectral reflectances.

The imager may comprise a sensor having a plurality of sensor classes, the method further comprising determining the spectral sensitivity of a selected sensor class by obtaining the ranking order for sensor responses from that selected sensor class.

The step of obtaining the ranking order may include obtaining the ranking order in response to reference spectra that are both flat and non-flat across the visible spectrum of the imager, the method further comprising using the determined spectral sensitivity data to linearise the imager's response.

The selected spectral information type may comprise illumination of the scene, wherein the reference target comprises a reflective target with known spectral reflectances.

The selected spectral information type may comprise reflectance of a surface in the scene, wherein the reference target comprises a transmissive target with known transmittances.

The imager may comprise a sensor having a plurality of sensor classes, the method further comprising determining obtaining the ranking order for each of at least selected ones of the plurality of sensor classes.

The method may further comprise encoding the estimated spectral sensitivity of the imager in a standard form for comparison with other imagers.

The standard form may comprise one or more matching functions for known primaries.

The method may further comprise including the reference target in the scene prior to imaging, the reference target defining a plurality of sub-targets to be ranked, each sub-target having a known spectral property obtainable from the alternate source.

The alternate source may comprise one or more selected from the set including:

a remote database; calibration data on the imager, illumination or reflectance; independent measurements on the imager, illumination or reflectance.

According to another aspect of the present invention, there is provided a reference target for use in the above described method, the reference target defining a plurality of sub-targets each having known spectral properties on at least one of the other spectral information types.

According to another aspect of the present invention, there is provided a method of creating a reference target comprising the steps of using a reference target having a plurality of sub-targets as set out in the above described method or variations, wherein each of the plurality of sub-targets has different spectral properties;

evaluating the sensor responses obtained from each sub-target and selecting a subset of the sub-targets to form a reference target in dependence on said evaluation.

The step of evaluating may include evaluating the position of the sensor response with respect to the distribution of sensor responses obtained, and selecting the sub-targets in dependence on the distribution.

The step of selecting may include selecting sub-targets to obtain a substantially uniform distribution.

The step of evaluating may include evaluating the quality of sensor response obtained.

According to another aspect of the present invention, there is provided a method for estimating spectral data on a selected one of a set of at least three spectral information types, the method comprising:

obtaining a ranking order for a plurality of sensor responses produced by the imager, each of the plurality of spectral responses being produced from a reference target in the scene;

obtaining, from an alternate source, data on at least two of the other spectral information types; and, determining a set of constraints, the set including, for each sequential pair combination of sensor responses when taken in said ranking order, a constraint determined in dependence on the ranking and on the other two or more spectral information types for the respective sensor responses;

in dependence on the ranking order and on the set of constraints, determining said spectral data that optimally satisfies said constraints.

According to another aspect of the present invention, there is provided a method for estimating spectral data comprising:

modelling signal output as the integral of N known functions and a single unknown input signal that is to be solved for; and, ranking pairs of the N responses the input signal is solved for.

The method may further comprise estimating the sensitivity of a sensor given N known responses corresponding to N known colour signal functions, said N known colour signal functions comprising illuminant spectra multiplied by known reflectances.

The method may further comprise representing an M-pixel blurred image as the integral of an unknown M-pixel input with M known blur functions; solving for the blur function and, in dependence on the blur function, deblurring the image.

According to another aspect of the present invention, there is provided system for estimating spectral data on a selected one of three spectral information types comprising:

illumination of a scene;
spectral sensitivity of an imager imaging the scene; and,
reflectance of a surface in the scene,
the system comprising:
a ranking component arranged to obtain a ranking order for a plurality of sensor responses produced by the imager, each of the plurality of sensor responses being produced from a reference target in the scene;
a processing component arranged to execute computer program code to:
receive the ranking order and data from an alternate source on the other two spectral information types,
determine a set of constraints, the set including, for each sequential pair combination of sensor responses when taken in said ranking order, a constraint determined in dependence on the ranking and on the other two spectral information types for the respective sensor responses, and
in dependence on the ranking order and on the set of constraints, determine said spectral data that optimally satisfies said constraints.

According to another aspect of the present invention, there is provided an imager including the above described system, the imager being operable to provide sensor responses to the system.

The imager may further comprise a light projector operable to project lights of different spectra into a scene being imaged by the imager, the ranking component being arranged to use at least selected sensor responses in respect of at least a selected one of the projected lights to generate the ranking order.

Suppose for some signal a(x) and some sensing system t(x) the following is a reasonable model of signal response:

$$\rho_{ij} = f_i\left(\int_{domain} t_l(x)a_j(x)dx + n_{ij}\right)$$

That is, the vector response is a non-linear increasing function (perhaps a different function per response channel) of a linear integral (corrupted by noise). Under these conditions and assuming knowledge of $a_j(x)$ embodiments of the present invention enable solving for $t_l(x)$ (and vice versa).

It will be appreciated that embodiments of the present invention can be used given more than 3 sensors and for modalities outside the visible spectrum.

In selected embodiments of the present invention, prior knowledge is used in combination with ranking information in order to guide estimation of sensor response to spectral information. The key insight that underpins embodiments of the presently claimed invention is that the rank order of spectral responses can be used to estimate spectra.

In attempting to estimate a solution simplifying assumptions must be made. There are, generally, four requirements to estimating spectra from RGBs. First, it is assumed there may be many reflectances (or lights) in a scene and the corresponding RGBs are recorded; second, two of the three species of spectral information (quantity) are known from prior measurements, calibration or another information source.

Advantageously, the imager such as a camera need not have a linear response (nor does it need to be simple to linearise). Similarly, the user is not required to have access to expensive lab-based measurement equipment.

Embodiments of the present invention can be used in many fields and applications. For example, an embodiment may be used to characterise a newly produced imaging system such as a camera to compare against others from the same production line or against others or simply for use in linearizing its output.

Embodiments of the present invention are applicable to imagers that respond linearly to light (double the light double the response) or non-linearly to light (double the light does not imply double the response). Unlike in prior art approaches, embodiments of the present invention seek to provide a level of robustness against non-linear imagers. Extensions to other domains such as removing blurring from images is also possible using principles of the method and system according to the present invention.

BRIEF DESCRIPTION OF THE DRAWINGS

Embodiments of the present invention will now be described, by way of example only, with reference to the accompanying drawings in which.

DETAILED DESCRIPTION

Figure 1A:
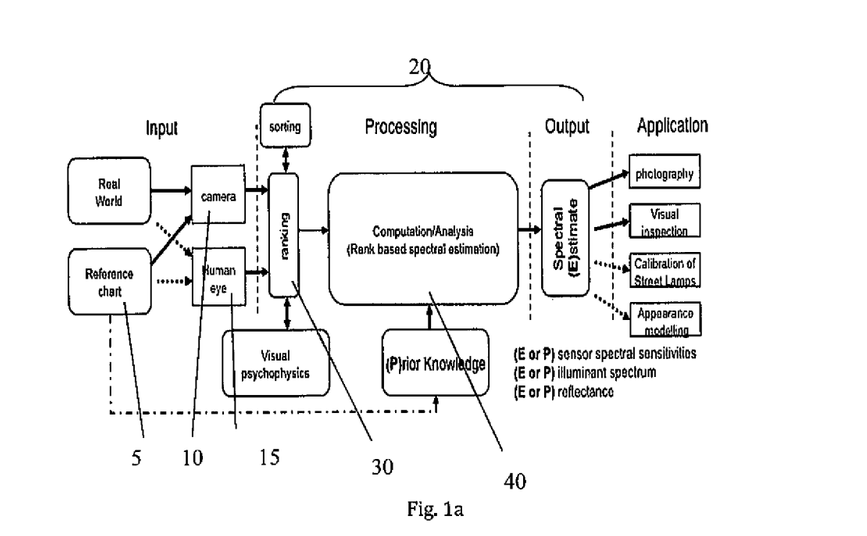
FIG. 1a is a schematic diagram of a rank based spectral estimation system according to an embodiment of the present invention.
Figure 1B:
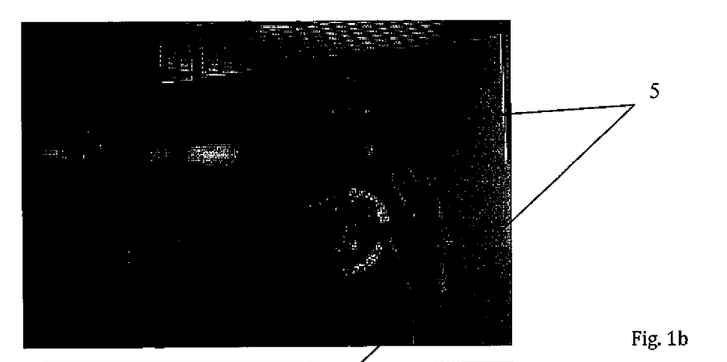
FIG. 1b is an example image prior to processing by an embodiment of the present invention.

FIG. 1a is a schematic diagram of a rank based spectral estimation system according to an embodiment of the present invention. An image (FIG. 1b) is taken (for example of a real world item or scene), the colours are 'ranked' and processed to estimate a spectral output, e.g. the illuminant spectral power distribution, which may then be used to solve problems in multiple application domains.

The illustrated embodiment concerns the following spectral information types:
illumination of a scene;
spectral sensitivity of an imager imaging the scene; and,
reflectance of a surface in the scene.

It will be appreciated that although other spectral information types or groupings of types are possible as is discussed elsewhere in this application.

The system 20 is arranged to receive inputs on the scene (in this embodiment spectral sensor responses from an imager such as a camera 10 on a selected one of the spectral information types on the scene and optionally also inputs from an observer 15 such as a human eye observing the scene). The scene in the illustrated embodiment is the real world in which a reference target such as a reference chart 5 has been introduced (or otherwise designated). It will be appreciated that any scene that could be imaged and in which a reference target could be introduced or designated could be used at any degree of scale (for example, embodiments could be used in calibration of nano-technology based sensors by introduction or creation of a nano scale reference target). In one embodiment, such targets could be created during fabrication of something that may be subsequently imaged. While a predetermined or bespoke (discussed later in this document) reference target is preferred, it will be appreciated that commercial reference targets or even existing artefacts in the scene having known or measured properties could be used.

A ranking component 30 is arranged to obtain a ranking order for a plurality of spectral sensor responses produced by the imager 10 (the ranking may be done by the system 20 or in dependence on inputs from an external system such as an image processing system, a microscope, telescope or the observer 15) for each of the plurality of spectral sensor responses being produced from the reference target 5 in the scene.

A processing component 40 receives the ranking order and data from an alternate source 50 (identified in FIG. 1a as "prior knowledge" but this may be a database, an external measurement system etc) on the two other two spectral information types concerning the scene and determines a set of constraints, the set including, for each sequential pair combination of spectral sensor responses when taken in said ranking order, a constraint determined in dependence on the ranking and on the other two spectral information types for the respective spectral sensor responses.

In dependence on the ranking order and on the set of constraints, the processing component is arranged to determine spectral data that optimally satisfies the constraints.

Figure 1C:
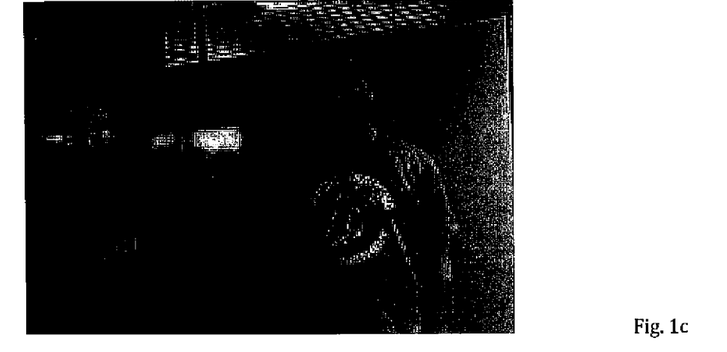
FIG. 1c is an example image after processing by an embodiment of the present invention.

In the same way that a 'ruler' is often placed in images to show scale (width), in preferred embodiments of the present invention a reference target (here a GretagMaebeth® colour checker) is included (or used if it is already in the scene) in the image that is captured, recorded or observed. Given the image of the target, the illuminant spectrum can be captured and used, for example, to discount the colour bias from the image in FIG. 1b resulting in the output in FIG. 1c.

In embodiments of the present invention, various different approaches can be taken depending on the spectral information available. For example, where two of the following are known (Prior Knowledge in FIG. 1a), the third element can be determined:
 light;
 reflectances; and,
 spectral camera sensitivities.

For example, spectral camera sensitivities can be determined if light and reflectances in the image are known.

While the above three spectral information types are preferred to be used in combination as they lend themselves well to camera/image sensor based situations, it will be appreciated that other information types(analogous to spectra) may be used in embodiments of the present invention. For example, an optical system (such as a lens) may introduce an optical blur (such as a point spread) into a captured image. In the same manner as light (illumination), reflectance, knowledge of the blur function can be used as of the known spectral information types (or it could be recovered from others of the spectral information types). That is, if we know the blur function and have the image responses (the pixels) then ranking can be used to estimate the un-blurred image. As before the method will work whether or not a non-linearity is applied to the blurred image as part of the image recording process.

Rank-Based Spectral Estimation Estimation (Linear Estimation by Ranking Non-Linear Responses)

To recover linear spectral quantities from non-linear camera RGBs, equation (1) is re-written (ignoring f( ) and the noise term) as:

$$\rho = \int_\omega q(\lambda)E(\lambda)S(\lambda)d\lambda = \int_\omega q(\lambda)C(\lambda)d\lambda \equiv \underline{q} \cdot \underline{c} \quad (2)$$

$$C(\lambda) = E(\lambda)S(\lambda)$$

where q (a single sensor spectral sensitivity, henceforth denoted as the sensor) and c (colour signal: denoting the illuminant power distribution multiplied by reflectance) are vectors of sampled measurements (for example, measurements may be taken at 31 wavelengths across the visible spectrum, 400 to 700 Nanometers, at 10 Nm intervals).

In the spectral estimation of camera sensitivities p and c are known or obtained from an alternate source (ie. independently of this method, possibly from prior calibration/measurement or some other knowledge) and are used to estimate spectral sensitivity, q.

Given the linear form of (2), the senor estimation can be written as a regression of the form: "find q which minimizes $\|Aq-\underline{p}\|$" where A is an N×31 matrix (each row is a spectral signal) and $\underline{p}$ are the corresponding N sensor responses (Dyas, B. (2000). Robust Color Sensor Response Characterisation. 8th Color Imaging Conf., 144-148 is an example of this approach).

Solving for q (or spectral estimation in general) is much harder if the camera response is non-linear. The nonlinearity f( ) in (1) is applied to compensate for anticipated display non-linearity, for efficient image encoding and to generate pleasing images. However, f( ) is not arbitrary but rather, almost without exception, an increasing function: if $p_1 > p_1$ ⇒ $f(p_1) > f(p_2)$ (because we expect the scale from dark to bright to be generally preserved, f(white)>f(black), and the mapping to be continuous).

Subject to these constraints, if the function were not increasing then different linear camera responses would be mapped to the same output value. This would imply both that the application of f( ) would lose information and that f( ) is non-invertible.

However, the inventors in the present application have observed that non-linear response can be linked to linear spectral quantities as follows:

$$\rho_1 > \rho_2 \Rightarrow q \cdot c_1 > q \cdot c_2 \Rightarrow (c_1 - c_2) \cdot q > 0 \text{(3: Spectral Sensitivity Estimation)}$$

In (3), $(c_1 - c_2) \cdot q > 0$ is a half-space constraint which splits the space of all possible sensors into two halves: into one where the sensor can reside and one where it is forbidden. Given N colour signals there are (N/2)(N−1) half space constraints whose intersection delimits the set of all possible sensors. It will be appreciated that half-space intersections is a known approach in computational geometry. An example of this approach can be found in Computational Geometry (3rd Ed.) by de Berg, M. et al., (1998) which is hereby incorporated by reference.

By obtaining a ranking of the sensor responses and relating these to half space intersections, the spectral shape of the sensor can be bound. Clearly, the more half space intersections available, the more accurate the bounding of the spectral shape of the sensor. An error tolerance measure can also be provided based on the number of half space intersections and confidence that the estimation is accurate.

A single sensor can be estimated by applying a selection or optimisation criterion: e.g. the smoothest sensor of a given magnitude that satisfies the constraints. Equation (3) works equally well regardless of any (increasing) f( ) applied to the image: no linearity assumption has been made.

In another embodiment of the present invention, equation (3) can also be reformulated to recover the spectral shape of the illuminant. Denote as $q_i$ the product of the ith surface reflectance with the known sensor q. The illuminant e must satisfy:

$$\rho_i > \rho_j \Rightarrow e \cdot q_i > e \cdot q_j \Rightarrow (q_i - q_j) \cdot e > 0 \quad \text{(4: Illuminant Estimation)}$$

Here, there are 3*(N/2)(N−1) half space constraints because constraints from the different sensor classes (for example, R channel, G channel B channel in RGB space) can be used.

Figure 2A:
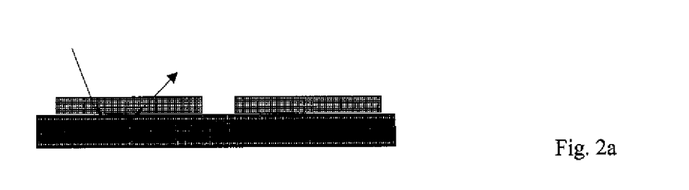
FIGS. 2a-2c illustrate possible imaging setups for use in measuring surface reflectance.
Figure 2B:
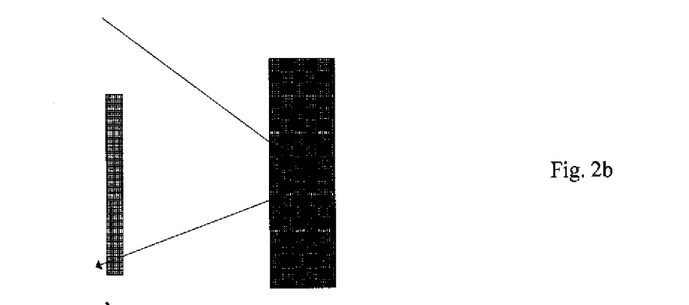

In another embodiment of the present invention, using a slightly modified imaging setup, ranking can also be used to directly measure surface reflectance. In FIG. 2a, light passes through a filter, is modulated by the reflectance and is reflected through the filter (before entering the camera). In FIG. 2b, light strikes the surface and then passes through a coloured filter in front of the surface (light passes through the filter once). Physically equivalent to light passing through different coloured filters would be to project lights of different spectra onto a surface. For example, this may be achieved by including a light projection system or component in the imager that could be used in conjunction with the imaging sensor for calibration, spectral estimation etc.

Figure 2C:
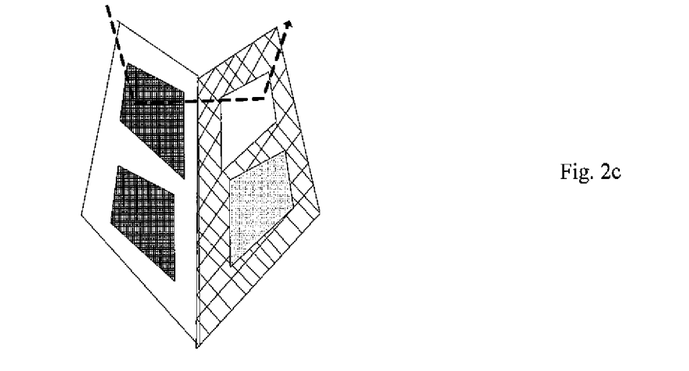

In FIG. 2c surface colour is used to modulate the colour of the light through interreflection. For all 3 viewing geometries the light (denoted by the arrow head) then enters a camera or eye.

Denoting the effect of placing an ith transmissive filter (with transmittance $\underline{k}^j$) in contact with a reflectance s as $u^i$s (note u not k because light passes though the filter is modulated by the reflectance and then passes through the filter a second time as is shown in the viewing geometry in the top FIG. 2). Denoting the effect of the ith filter on a sensor q by $q^i = qu^i$, then a pair of filters induces the following half-space constraint. As for illuminant estimation there are 3*number of filters choose 2 hyperplane constraints:

$$\rho^1 > \rho^2 \Rightarrow s \cdot q^1 > s \cdot q^2 \Rightarrow (q^1 - q^2) \cdot s > 0 \quad \text{(5: Reflectance Estimation)}$$

Algorithm Details

The processing involved in estimating the spectral shape of the spectral sensitivities (Eqn (3)), the illuminant (Eqn (4)) or the surface reflectance (Eqn (5)) is the same. Each ranking (observation that one sensor response is bigger than another) leads to a half-space constraint. The half-space splits the space of spectra into two such that the spectrum being estimated lies in one half (but not the other). By observing many pairs of responses many half-space constraints are obtained. In an optimal solution, the spectral quantity (spectral data) being estimated must satisfy all these constraints simultaneously, although as discussed, a subset may be selected to be satisfied or, in some cases, a different solution may be selected to "best" fit the constraints.

Generally, each half-space constraint may be written as H (e.g. in the case of spectral sensitivity estimation, the set of all vectors which dot product into difference in colour signals in eqn. (3) that is bigger than 0) and the spectrum to be estimated as v, then mathematically it can be written $$\underline{v} \in \cap_{i=1}^{n} H_i \quad \text{(6: intersection of half spaces)}$$

The optimal solution (the spectrum sought) is in the intersection of all half-spaces. As written, (6) identifies that the spectrum lies in a bounded region of space but does not characterise a single estimate. A single estimate may be arrived at by imposing an additional constraint. For example, $$\min_{\underline{v}} \|\nabla \underline{v}\| \quad \text{(7: finding a single spectral estimate)}$$

$$\text{s.t.} \sum_j v_j = 1 \; \& \; \underline{v} \in \bigcap_{i=1}^{n} H_i$$

In equation (7), the magnitude of the sum of derivatives of v (the curve we seek is as smooth as possible) is minimized subject to the constraint that v sums to 1 (the area under the curve is 1) and that the half-space constraint is satisfied.

Other optimisations are possible. For example, another approach would be to solve for the spectrum that is maximally non smooth and has vector magnitude equal to 1. In fact (7) is just an illustration of how you can select a single member from a constraint set. Any optimisation that returns a single answer would be a candidate criterion to use. Equation (7) can be solved for directly and rapidly using quadratic programming.

Equation (7) is potentially a simple algorithm for rank-based spectral estimation. However, spectral recovery may sometimes be more complex. Consider the case where two camera responses that are almost the same. Here, the addition of a small amount of image noise might flip the rank order.

Figure 3:
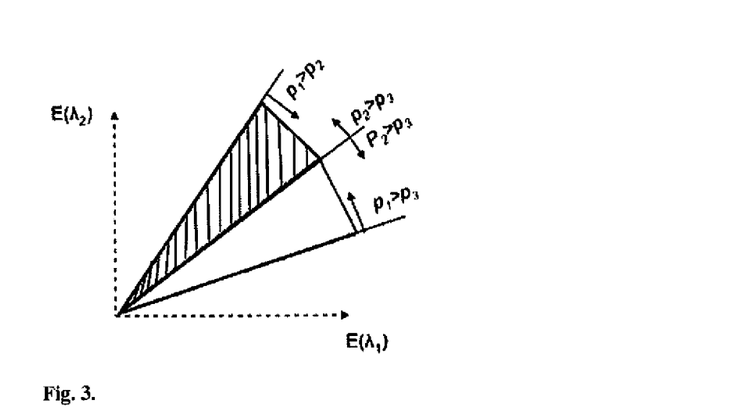
FIG. 3 is a graph illustrating a single flipping of rank order pushing a sensor to lie in a different half-space.

FIG. 3 illustrates what happens in this case to the half-space constrains (where for ease of description we show sensor recovery at only two wavelengths). This diagram shows that a single flipping of rank order pushes the sensor to lie in a different half-space. But, it could be that on account of this flipping that the intersection of all the n half spaces is now empty (excluding the origin which is always allowed).

Preferred embodiments of the present invention are robust to 'rank-flipping'. This may be achieved in various ways as discussed by example below. For example, different constraints can be weighted as being more 'likely' than others (this might be done if for example we knew that small camera measurements were likely to be corrupted by noise).

One embodiment for the case where the half space constraints do not intersect is described in Equation (8). Here, the notation $d(H_i, \underline{v})$ is used to denote the distance between the closest point in $H_i$ to $\underline{v}$. When the intersection of half-spaces is the null set (no intersection) an optimal solution to meet the constraints clearly cannot be found by a space bounded by an intersection of the half-spaces. Instead, one way of estimating an optimal solution is to solve for $$\min_{\underline{v}} \sum_{i=1}^{N} d(H_i, \underline{v}) \; \text{s.t.} \; \sum_j v_j = 1 \quad (8)$$

A solution can be arrived at by solving for (8) using POCS (Projection on Convex sets as described in Vector Space Projections by Stark., H. et al, (1998), John Wiley and Sons, the content of which is herein incorporated by reference). This method then arrives at a solution for the spectral estimates that best satisfies all constraints.

Other optimisation approaches are possible. Furthermore, strategies may be applied to make rank-based spectral estimation more robust. For example, a selection of the constraints may be made to include using only a subset of the half-space (e.g. according to knowledge of how reliable they are), weakening the half-space constraint so we use h.$\underline{v}$>−ϵ instead of (h.$\underline{v}$>0) or, in (8). Weights may also be applied to might weight the half-space distances.

Making Rankings

In one embodiment, the rankings may be made by looking at the values recorded by a camera (or other imaging device). For example a picture may be taken that includes a reference target that has a set of known reflectances under a known light. The corresponding red-pixel (or green or blue assuming RGB sensor type; or other sensor species if another type is used) camera measurements may then be ranked. According to (3) and (7) or (8), a solution can then be determined for the red camera spectral sensitivity function.

The ranking may be performed by a computer system based on some predetermined criteria. Alternatively, it may be made by a human (or animal) subject and data on the rankings then inputted into a computer system. In both the automated and manual ranking approaches, the same processing and mathematical analysis is then used to interpret ranking results.

The use of a human ranking stimuli is potentially a powerful approach. For example, assuming the visual system's colour matching functions are known (these are a linear combination of the actual sensitivities and can be assumed known to a reasonable approximation), ranking judgements can then be analysed to uncover the actual sensitivities used in a given ranking scenario (an observer may be asked to rank some a range of reddish samples from most to least reddish). If the matching functions are denoted by a 31×3 matrix X, equation (8) is modified to:

$$\min_{\underline{v}} \sum_{i=1}^{N} d(H_i, \underline{v}) \text{ s.t. } \sum_{j} v_j = 1 \, \& \, \underline{v} = X\underline{c} \quad (9)$$

where c is a 3×1 vector. Solving (9) allows discovery of how an observer is viewing a particular scene (and would be a useful pre-processing step in visual experiments with human subjects). Clearly in applications such as cinematography, manufacture (where color tone or cast may be important and a decision shared by people in remote locations), this data can then be taken into account.

It is well known that the precise spectral shape of colour matching function varies from person to person. Knowledge of the precise matching curves therefore may be useful in solving colour tasks (e.g. in reproducing a picture on a colour monitor that looks correct to different observers).

The set of all possible matching curves is denoted by C (C is some convex region of 31-space). C might be determined by taking the convex closure of a set of matching curves determined for multiple observers using traditional estimation techniques. For the 'redness' ranking task proposed above equation (9) is modified as:

$$\min_{\underline{v}} \sum_{i=1}^{N} d(H_i, \underline{v}) \text{ s.t. } \sum_{j} v_j = 1 \, \& \, \underline{v} \in C \quad (10)$$

By running 3 ranking trials, e.g. ranking redness, greenness, and blueness, three spectral curves are obtained from which 'per individual' matching curves can easily be obtained. This approach can take into account the so-called "deviant observer".

Given knowledge of an observer's spectral sensitivities, ranking tasks can be run and the results of which can be used to recover the spectrum of the light or the spectrum of reflectances.

Example Computation (Illuminant Estimation)

In one example, a SONY DXC 930 camera was used in a scene under a fluorescent light, selected at random from a set, and 1995 reflectances. Using eqn. (1), and assuming just 0.01% (of peak signal) noise, 100 RGB measurements were obtained for a reflectance target with 100 randomly selected reflectances. These were imaged under a fluorescent light.

Because there were 100 reflectances, there were '100 choose 2' pairs of surfaces for each sensor class so 3*50*99=14850 half-space constraints that can be used to estimate the illuminant.

Figure 4A:
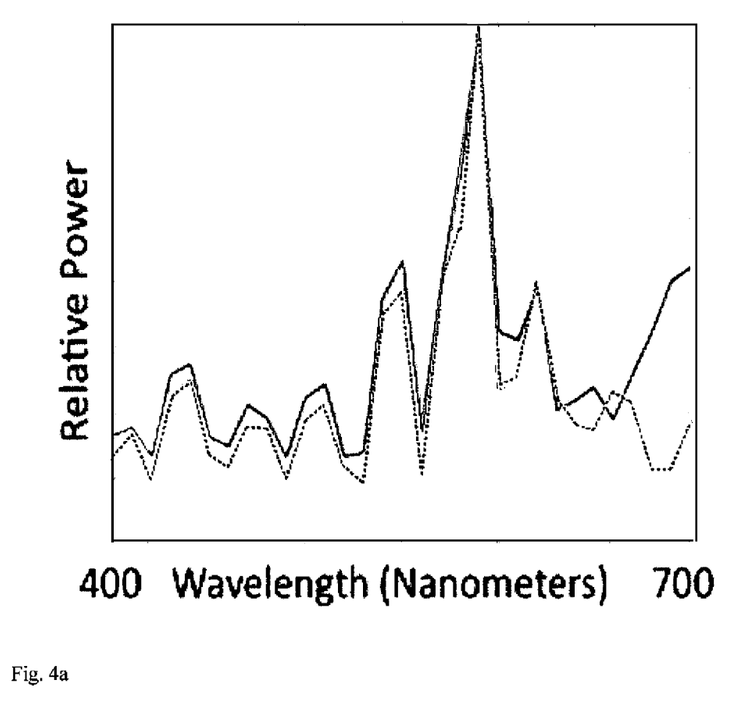
FIG. 4a is a graph illustrating recovered illuminant using an embodiment of the present invention.

The recovered illuminant (solid line in FIG. 4a: the illuminant that satisfies all half-space constraints, is the smoothest unit magnitude in this intersection set) is contrasted with the actual light (dotted line) in FIG. 4a. Quantitatively, the % spectral error (the magnitude of the difference between actual and estimated spectrum divided by the magnitude of the actual) is 15%.

Figure 4B:
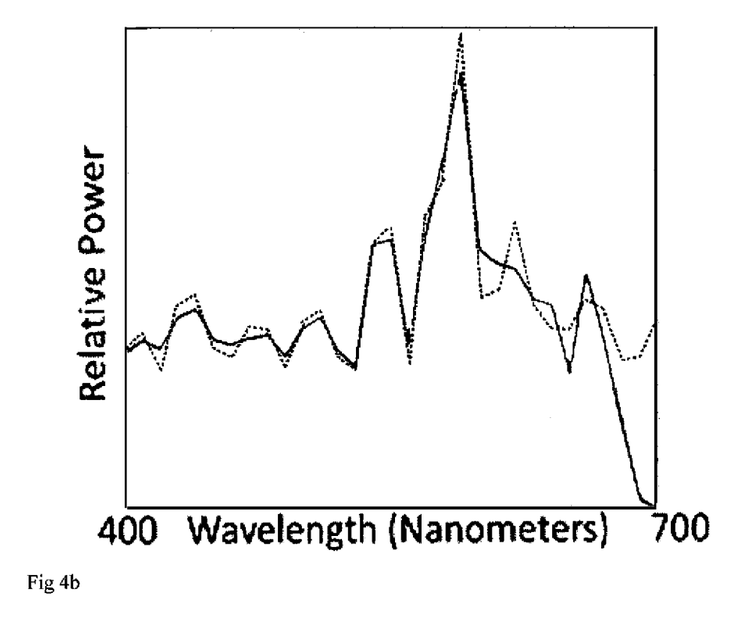
FIG. 4b is a graph illustrating recovered illuminant using a prior art approach; and, FIGS. 5a and 5b are graphs plotting sensor response against surface reflectance.

FIG. 4b shows the results of a prior art approach (dotted line being true illuminant spectrum, solid line results of prior art approach). The approach is a robust regularised linear method disclosed in Dyas, B. (2000). Robust Color Sensor Response Characterisation. 8th Color Imaging Conf., 144-148 (modified to the solve the problem of illuminant estimation). The spectral error of this approach is larger than that of the embodiment of the presently claimed invention at 22%.

In a second experiment, noise in the RGBs was increased to 1% of peak signal. Now, the linear Dyas method returns a spectrum with a spectral error of 26%.

The approach of seeking the optimal solution based on half-space intersections used in the embodiment applied in FIG. 4a failed in the second experiment. This was because the intersection of all half-spaces was empty. However, once the failure was detected and a more robust approach applied (by weighting the constraints), the spectrum estimated had only a 17% spectral error.

In a third experiment, a small departure from linearity is introduced (the sensor responses are less than 1% different). This small change resulted in a 60% recovery error for the Dyas linear method. In contrast, the error from the embodiment of the present invention was unchanged demonstrating the power of the ranking approach of embodiments of the present invention.

Further experiments demonstrated that even with an extreme non-linearity, rank-based estimation works well (when the linear method fails completely), thus demonstrating the power of ranking.

Ranking to Improve Linearisation

Figure 5A:
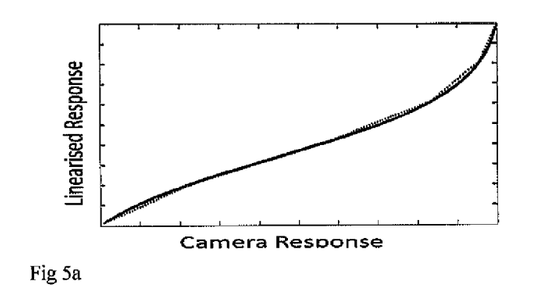
Figure 5B:
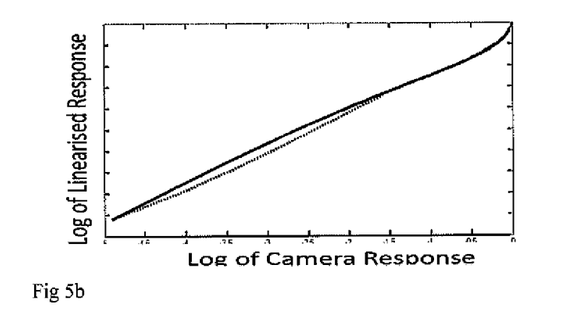

Ranking can be used to provide, and improve upon, the calibration (estimating the camera spectral response and linearising the camera) required by all linear systems based reflectance recovery algorithms. Conventional Linearisation is conceptually very easy to describe: as shown in FIGS. 5a and 5b, sensor response is plotted against the known mean reflectance values for an achromatic scale e.g. the 6 grey patches on the bottom row of the Macbeth checker (see FIG. 1, right column). Joining the dots defines the linearization function. Unfortunately, 6 interpolation points are insufficient to model many of the typical non-linearities found in real images. In FIG. 5a the solid line is the true linearization $f^{-1}(\ )$ and the dotted line is a 6 point linear interpolation. Visually, the linearization looks good. But, in FIG. 5b, a re-plot on a log-log scale (much more relevant to photography and perception) shows that the linearization error can be has high as 0.35 log units (visually highly significant).

In principle, more interpolation points could be found if the camera's exposure is changed. However, such exposure control is often not available (e.g. in pictures taken by mobile phones).

In an embodiment of the present invention, rank-based estimation is used to estimate the spectral sensitivities of the camera first and then its response can be linearised. Doing so, results in the spectral sensitivities being known and allows use of the responses from all 24 checker reflectances (in the case of the reference target shown in FIG. 1, although it will be appreciated other targets could be sued with differing numbers of responses) to define the linearization function. In experiments, the all-patch linearization method produced virtually perfect (less than 0.05 log unit difference) results.

Reference Target Design

In a preferred embodiment of the present invention, one or more of the above described methods are used in the design of a reference target such as a colour chart. This approach enables production of an optimal reference target that can improve performance of embodiments of the present invention (or for that matter other spectral estimation methods and systems) in subsequent estimations.

It will be appreciated that the spectral quantities that can be estimated/determined through ranking depends to some extent on the spectral properties of the reference target (reference targets may, for example be a reflective target or transmissive filters having known spectral properties).

In this embodiment, a parsimonious reference target is determined that supports rank-based estimation.

For example, for a known camera system the reference target design system may start with a reference target divided into a large number sub-targets having different reflectances. A rank-based spectral estimation may be performed using a wide range of illuminant and systematically, the 'power' of each reflectance is measured (of recovering the illuminant spectrum). A 'weak' reflectance would, if removed from the test set, minimally affect the accuracy of spectral recovery. Removing weak reflectances one after another enables reduction of the number of reflectances needed in a colour reference target to only those that may sway the operation of the rank based estimation.

In embodiments of the present invention, power of reflectance for each sub-targets may is measured and those targets having the weakest reflectance may be is removed from the set of targets. This process is repeated until such time as a predetermined threshold is met. The threshold itself may vary depending on the aim of the reference target. For example, a size or cost constraint may be the threshold, with the number of sub-targets needing to be minimised so as to just fit under the size or cost (of manufacture) constraint. Alternatively, the power of reflectances may be monitored and once the power of a sub-target being considered for removal from the set exceeds the threshold, it may be deemed that the target is sufficiently minimised. Evaluation may include evaluating the position of the sensor response with respect to the distribution of sensor responses obtained, and selecting the sub-targets in dependence on the distribution. The selection may include selecting sub-targets to obtain a substantially uniform distribution. The evaluation may include evaluating the quality of sensor response obtained.

It will be appreciated that the sub-targets could be in the form of separate physical swatches or grouped together in some fashion such as colour charts. The sub-targets could be physical or virtual at design time (such as displayed imagery). Once sub-targets have been identified, the reference target can be printed, assembled or otherwise manufactured at the site of testing or sent to a remote site for manufacture.

It will be appreciated that the constraints need not be modelled as half-space constraints and could be modelled in other ways. Additionally, where half-spaces are used, the constraints need not themselves define a half-space—they could instead each define an extension of a half-space constraint.

At least a portion of the embodiments described herein may be performed by a process defined by code executing within a processor of a computer. The code can comprise software instructions that are provided to a physical memory that is accessible to the processor of the computer. The code can be arranged as firmware or software, and can be organized as a set of modules such as discrete code modules, function calls, procedure calls or objects in an object-oriented programming environment. If implemented using modules, the embodiment can comprise a single module or a plurality of modules that operate in cooperation with one another.

Optional embodiments of the invention can be understood as including the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although illustrated embodiments of the present invention have been described, it should be understood that various changes, substitutions, and alterations can be made by one of ordinary skill in the art without departing from the present invention which is defined by the recitations in the claims below and equivalents thereof.

The disclosure of priority application number GB 1119405.7 and of the abstract accompanying this application are herein incorporated by reference.

The invention claimed is:

1. A method for estimating spectral data on a selected one of three spectral information types comprising:
   illumination of a scene;
   spectral sensitivity of an imager imaging the scene; and,
   reflectance of a surface in the scene,
   the method comprising:
   obtaining a ranking order for a plurality of sensor responses produced by the imager, each of the plurality of sensor responses being produced from a reference target in the scene;
   obtaining, from an alternate source, data on the other two spectral information types; and,
   determining a set of constraints, the set including, for each sequential pair combination of sensor responses when taken in said ranking order, a constraint determined in dependence on the ranking and on the other two spectral information types for the respective sensor responses;
   in dependence on the ranking order and on the set of constraints, determining said spectral data that optimally satisfies said constraints.

2. A method as claimed in claim 1, wherein the step of determining said spectral data includes:
   in dependence on the ranking order and on said constraints, determining a space bounded by the intersection of at least a subset of said constraints; and,
   determining said spectral data on the selected spectral information type that optimally satisfies said constraints whereby said estimated spectral data lies in a space bounded by the intersection of at least a subset of said constraints.

3. The method as claimed in claim 2, wherein the step of determining said space includes selecting a subset of said constraints in dependence on data on reliability of the respective constraints.

4. The method as claimed in claim 3, further comprising performing the step of applying a weighting factor or selecting a subset upon the step of determining the space meeting a predetermined criterion, wherein the predetermined criterion comprises determining there is substantially no space bounded by the intersection of the at least a subset of said constraints.

5. The method as claimed in claim 3, further comprising guiding said determination of said spectral data using information about the likely spectral shape of the spectral data.

6. The method as claimed in claim 5, further comprising requiring the spectral data to be a linear sum of a small number of basis functions or a member of a defined convex set that is a subset of all spectral quantities.

7. The method as claimed in claim 2, further comprising generating a measure of uncertainty with respect to said estimated spectral data, said measure of uncertainty being dependent on the size of the space bounded by the intersection of the at least a subset of said constraints, wherein said measure of uncertainty is weighted upon application of a weighting factor to one or more constraints or upon selection of a subset of said constraints in dependence on data on reliability.

8. The method as claimed in claim 1, wherein each constraint comprises a half-space constraint.

9. The method as claimed in claim 1, wherein each constraint is a defined extension of a half-space constraint.

10. The method as claimed in claim 1, wherein the step of determining said spectral data that optimally satisfies said constraints includes solving a projection on convex sets to determine the spectral data that optimally satisfies said constraints.

11. The method as claimed in claim 10, wherein the step of solving a projection on convex sets comprises solving:

$$\min_{\underline{v}} \sum_{i=1}^{N} d(H_i, \underline{v}) \text{ s.t. } \sum_{j} v_j = 1$$

Where:
$H_i$ is the set of constraints
$\underline{v}$ is the spectral data to be estimated; and,
$d(H_i, v)$ is the distance between the closest point in $H_i$ to $\underline{v}$.

12. The method as claimed in claim 1, wherein the imager comprises an eye of a viewer of the scene, the method comprising obtaining the ranking order from the viewer.

13. The method as claimed in claim 1, wherein determining the spectral data that optimally satisfies said constraints is evaluated in dependence on criterion selected from the set including:
minimising a least-squares error criterion; minimizing a robust least-squares criterion; convex minimisation; quadratic programming.

14. The method as claimed in claim 1, wherein the selected spectral information type comprises spectral sensitivity of the imager imaging the scene, wherein the reference target comprises a reflective target with known spectral reflectances.

15. The method as claimed in claim 14, wherein the step of obtaining the ranking order includes obtaining the ranking order in response to reference spectra that are both flat and non-flat across the visible spectrum of the imager, the method further comprising using the determined spectral sensitivity data to linearise the imager's response.

16. The method as claimed in claim 1, wherein the selected spectral information type comprises illumination of the scene, wherein the reference target comprises a reflective target with known spectral reflectances, wherein the selected spectral information type comprises reflectance of a surface in the scene, wherein the reference target comprises a transmissive target with known transmittances.

17. The method as claimed in claim 1, further comprising including the reference target in the scene prior to imaging, the reference target defining a plurality of subtargets to be ranked, each sub-target having a known spectral property obtainable from the alternate source, wherein the alternate source comprises one or more selected from the set including:
a remote database; calibration data on the imager, illumination or reflectance; independent measurements on the imager, illumination or reflectance.

18. A method for estimating spectral data on a selected one of a set of at least three spectral information types, the method comprising:
obtaining a ranking order for a plurality of sensor responses produced by an imager, each of the plurality of spectral responses being produced from a reference target in the scene;
obtaining, from an alternate source, data on at least two of the other spectral information types; and,
determining a set of constraints, the set including, for each sequential pair combination of sensor responses when taken in said ranking order, a constraint determined in dependence on the ranking and on the other two or more spectral information types for the respective sensor responses;
in dependence on the ranking order and on the set of constraints, determining said spectral data that optimally satisfies said constraints.

19. A system for estimating spectral data on a selected one of three spectral information types comprising:
illumination of a scene;
spectral sensitivity of an imager imaging the scene; and,
reflectance of a surface in the scene,
the system comprising:
an imager operable to provide sensor responses;
a ranking component arranged to obtain a ranking order for a plurality of sensor responses produced by the imager, each of the plurality of sensor responses being produced from a reference target in the scene;
a processing component arranged to execute computer program code to:
receive the ranking order and data from an alternate source on the other two spectral information types,
determine a set of constraints, the set including, for each sequential pair combination of sensor responses when taken in said ranking order, a constraint determined in dependence on the ranking and on the other two spectral information types for the respective sensor responses, and
in dependence on the ranking order and on the set of constraints, determine said spectral data that optimally satisfies said constraints.

20. The system as claimed in claim 19 further comprising a light projector operable to project lights of different spectra into a scene being imaged by the imager, the ranking component being arranged to use at least selected sensor responses in respect of at least a selected one of the projected lights to generate the ranking order.

* * * * *